(12) United States Patent
Mizuma (10) Patent No.: US 12,309,484 B2
(45) Date of Patent: May 20, 2025

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Kenshiro Mizuma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/659,477

(22) Filed: May 9, 2024

(65) Prior Publication Data

US 2024/0292082 A1 Aug. 29, 2024

Related U.S. Application Data

(63) Continuation of application No. 18/355,609, filed on Jul. 20, 2023, now Pat. No. 12,010,419, which is a continuation of application No. 17/511,782, filed on Oct. 27, 2021, now Pat. No. 11,750,913.

(30) Foreign Application Priority Data

Nov. 13, 2020 (JP) ................... 2020-189787

(51) Int. Cl.
*H04N 23/617* (2023.01)
*H04N 23/62* (2023.01)
*H04N 23/661* (2023.01)
*H04N 23/695* (2023.01)

(52) U.S. Cl.
CPC .......... *H04N 23/617* (2023.01); *H04N 23/62* (2023.01); *H04N 23/661* (2023.01); *H04N 23/695* (2023.01)

(58) Field of Classification Search
CPC .......... H04N 5/23225; H04N 5/23299; H04N 5/23206; H04N 5/23216; H04N 5/23203; H04N 7/181; H04N 23/617; H04N 23/69; H04N 23/695; H04N 23/62; H04N 23/661; G06F 3/0338
USPC ...................................... 348/207.1
See application file for complete search history.

(56) References Cited

U.S. PATENT DOCUMENTS

| | | | |
|---|---|---|---|
| 7,236,185 B2 | 6/2007 | Terada et al. | |
| 8,953,051 B2 * | 2/2015 | Otsuka | H04N 23/64 348/207.1 |
| 9,246,448 B2 * | 1/2016 | Shiobara | H03F 3/3079 |
| 9,723,195 B2 | 8/2017 | Ashitani | |
| 10,083,601 B2 | 9/2018 | Nakamura et al. | |

(Continued)

FOREIGN PATENT DOCUMENTS

JP 3996960 B2 10/2007

*Primary Examiner* — Pritham D Prabhakher
(74) *Attorney, Agent, or Firm* — Cowan, Liebowitz & Latman, P.C.

(57) ABSTRACT

A control apparatus comprises a determination unit configured to, in a case where a user operation for removing an image capturing apparatus being a control target from the control target is performed, determine whether or not the image capturing apparatus is executing a specific function, and a control unit configured to, in a case where the determination unit determines that the image capturing apparatus is executing the specific function, cause the image capturing apparatus to stop the specific function.

12 Claims, 8 Drawing Sheets

(56) References Cited

U.S. PATENT DOCUMENTS

| | | |
|---|---|---|
| 10,157,526 B2 * | 12/2018 | Galvin .................... H04L 67/55 |
| 10,200,619 B2 | 2/2019 | Mitani |
| 10,225,452 B2 | 3/2019 | Kozakura |
| 10,592,771 B2 | 3/2020 | Astrom et al. |
| 11,032,136 B2 | 6/2021 | Karivaradaswamy |
| 11,082,665 B2 | 8/2021 | Galvin et al. |
| 11,146,721 B2 | 10/2021 | Ikeda et al. |
| 11,343,544 B2 | 5/2022 | Larrew et al. |
| 11,394,927 B2 | 7/2022 | Buibas et al. |
| 11,520,938 B2 | 12/2022 | Yu et al. |
| 2002/0191080 A1 | 12/2002 | Terada et al. |
| 2011/0043663 A1 * | 2/2011 | Tsuchiya ................ H04N 23/66 348/222.1 |
| 2012/0313781 A1 | 12/2012 | Barker et al. |
| 2014/0036090 A1 | 2/2014 | Charles et al. |
| 2014/0092262 A1 * | 4/2014 | Otsuka ................ H04N 23/695 348/207.1 |
| 2015/0172530 A1 * | 6/2015 | Shintani ................ H04N 23/66 348/211.8 |
| 2015/0264202 A1 * | 9/2015 | Pawlowski .......... H04N 23/633 348/207.11 |
| 2015/0304574 A1 * | 10/2015 | Yanagi .................. H04N 23/66 348/158 |
| 2016/0232764 A1 * | 8/2016 | Galvin ................ H04N 23/661 |
| 2016/0277662 A1 | 9/2016 | Ashitani |
| 2017/0038043 A1 | 2/2017 | Nakamura et al. |
| 2017/0187946 A1 | 6/2017 | Kozakura |
| 2017/0195577 A1 | 7/2017 | Mitani |
| 2017/0251139 A1 | 8/2017 | Ashitani |
| 2018/0189600 A1 | 7/2018 | Astrom et al. |
| 2018/0324383 A1 * | 11/2018 | Kaneko ................ H04N 7/188 |
| 2019/0182437 A1 * | 6/2019 | Oikkonen ........... H04N 23/695 |
| 2019/0191074 A1 | 6/2019 | Ikeda et al. |
| 2019/0238405 A1 | 8/2019 | Karivaradaswamy |
| 2020/0099896 A1 | 3/2020 | Galvin et al. |
| 2021/0149945 A1 | 5/2021 | Kinoshita |
| 2021/0165917 A1 | 6/2021 | Yu et al. |
| 2021/0168298 A1 | 6/2021 | Yamashita et al. |
| 2021/0409792 A1 | 12/2021 | Larrew et al. |

* cited by examiner

CONTROL APPARATUS, CONTROL METHOD, AND NON-TRANSITORY COMPUTER-READABLE STORAGE MEDIUM

CROSS-REFERENCE TO RELATED APPLICATION

This application is a continuation of application Ser. No. 18/355,609, filed Jul. 20, 2023, which is a continuation of application Ser. No. 17/511,782, filed Oct. 27, 2021, which issued as U.S. Pat. No. 11,750,913 on Sep. 5, 2023, the entire disclosures of which are hereby incorporated by reference.

BACKGROUND OF THE INVENTION

Field of the Invention

The present invention relates to a technique for controlling an image capturing apparatus.

Description of the Related Art

Currently, in the video production market, systems for remotely controlling a plurality of remote cameras (hereinafter simply referred to as "cameras") connected to a network so that fewer cameramen can control a plurality of cameras are increasing. In such systems, an application capable of changing the settings of each camera and controlling PTZ (pan/tilt/zoom) while displaying images of a plurality of cameras is used. The control of the PTZ, the control of the focus, and the like can also be simultaneously controlled for a plurality of cameras. In such an application, it is possible to select whether or not to set each camera as a control target due to the feature that it can be connected to a plurality of cameras. The invention disclosed in Japanese Patent No. 3996960 proposes a camera control system which acquires a camera state from a camera to be controlled and displays that the camera is not controllable when it is determined that the camera is not controllable.

Specific functions such as PTZ control and focus control are controlled by a control method called start/stop control in which a control start command and a control stop command are used in a set. In the above-described application, when a camera is removed from being a control target in a state where a control stop command is not transmitted after the start command of a specific function is transmitted, there is a problem that the command for stopping the specific function will not be transmitted to the camera and the limit of the movable range of the function will be reached. In an operation that conforms to the operator's intent, cameras that are not a control target should have stopped operating.

SUMMARY OF THE INVENTION

The present invention provides a technique for restricting the operation of an image capturing apparatus that is not a control target.

According to the first aspect of the present invention, there is provided a control apparatus comprising: a determination unit configured to, in a case where a user operation for removing an image capturing apparatus being a control target from the control target is performed, determine whether or not the image capturing apparatus is executing a specific function; and a control unit configured to, in a case where the determination unit determines that the image capturing apparatus is executing the specific function, cause the image capturing apparatus to stop the specific function.

According to the second aspect of the present invention, there is provided a control method that a control apparatus performs, the method comprising: in a case where a user operation for removing an image capturing apparatus being a control target from the control target is performed, determining whether or not the image capturing apparatus is executing a specific function; and in a case where it is determined that the image capturing apparatus is executing the specific function, causing the image capturing apparatus to stop the specific function.

According to the third aspect of the present invention, there is provided a non-transitory computer-readable storage medium storing a computer program that cause a computer to function as: a determination unit configured to, in a case where a user operation for removing an image capturing apparatus being a control target from the control target is performed, determine whether or not the image capturing apparatus is executing a specific function; and a control unit configured to, in a case where the determination unit determines that the image capturing apparatus is executing the specific function, cause the image capturing apparatus to stop the specific function.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
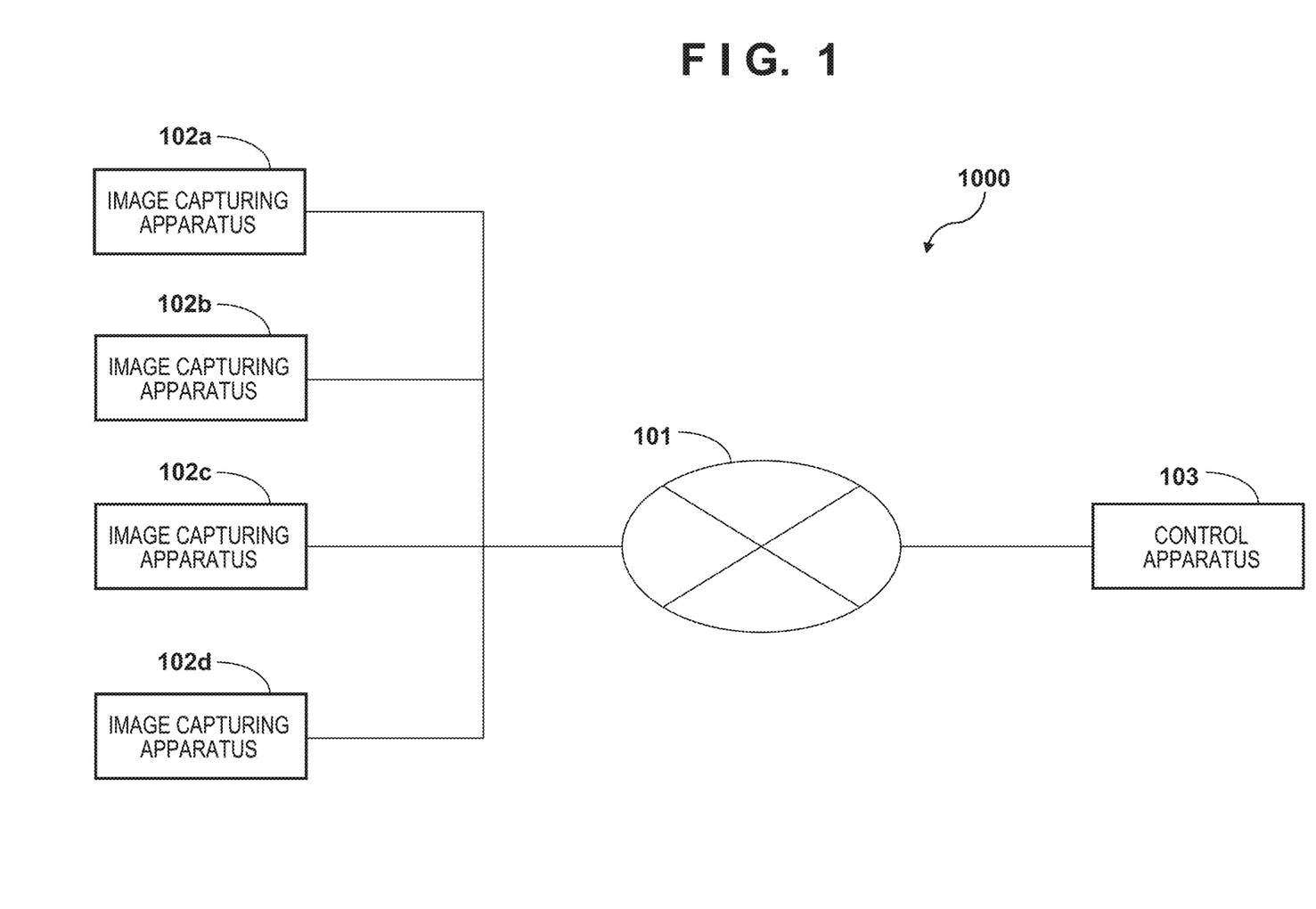
FIG. 1 is a view illustrating an example of a configuration of a camera system 1000.

An example of a configuration of a camera system 1000 according to the present embodiment is described with reference to FIG. 1. As shown in FIG. 1, the camera system 1000 includes a plurality of image capturing apparatuses (image capturing apparatus 102a, image capturing apparatus 102b, image capturing apparatus 102c, image capturing apparatus 102d) and a control apparatus 103, and the plurality of image capturing apparatuses and the control apparatus 103 are connected to a network 101.

First, the network 101 is described. The network 101 includes, for example, a plurality of routers, switches, cables, and the like that conform to the communication standard of Ethernet®. Note that, for the network 101, as long as data communication can be performed between the plurality of image capturing apparatuses and the control apparatus 103, the communication standard, scale, and configuration is not limited to a specific communication standard, a specific scale, or a specific configuration. The network 101 may comprise the Internet, a wired LAN (Local Area Network), a wireless LAN (Wireless LAN), a WAN (Wide Area Network), or a combination thereof.

Next, the plurality of image capturing apparatuses are described. In the present embodiment, since image capturing apparatus 102a, image capturing apparatus 102b, image capturing apparatus 102c, and image capturing apparatus 102d, which are the plurality of image capturing apparatuses, are apparatuses having the same configuration and the same function, these image capturing apparatuses will be referred to as image capturing apparatuses 102 hereinafter. Therefore, the following descriptions of the image capturing apparatuses 102 are similarly applied to each of the image capturing apparatus 102a, the image capturing apparatus 102b, the image capturing apparatus 102c, and the image capturing apparatus 102d. In addition, although the number of the image capturing apparatuses 102 in FIG. 1 is set to 4, the present invention is not limited to this number.

The image capturing apparatuses 102 capture a moving image and transmit an image of each frame in the moving image as a captured image to the control apparatus 103 via the network 101. In addition, the image capturing apparatuses 102 perform various controls in accordance with control commands transmitted from the control apparatus 103. Note that the image capturing apparatuses 102 may be an apparatus that periodically or irregularly captures a static image and transmits the captured still image to the control apparatus 103 via the network 101 as a captured image. The image capturing apparatuses 102 may compress and encode the captured image and then transmit it to the control apparatus 103 via the network 101. In addition, the image capturing apparatuses 102 may transmit the captured image to the control apparatus 103 in response to a request from the control apparatus 103 or may transmit the captured image to the control apparatus 103 without receiving the request. In addition, the image capturing apparatuses 102 may also transmit the captured image to other apparatuses in addition to the control apparatus 103.

Next, the control apparatus 103 is described. The control apparatus 103 is a computer apparatus such as a PC (Personal Computer), a tablet terminal device, or a smart phone. Note that, the control apparatus 103 may be an apparatus such as a specialized controller device for operating the image capturing apparatus 102.

The control apparatus 103 receives and stores the captured images transmitted from the image capturing apparatus 102, displays these, and transfers these to other apparatuses. In addition, the control apparatus 103 transmits control commands inputted in response to user operations to the image capturing apparatus 102. Control commands are "control commands for causing the image capturing apparatuses 102 to execute specific functions". Such control commands include, for example, control commands for controlling panning, tilting, and zooming of the image capturing apparatuses 102. In addition, such control commands include, for example, control commands for controlling the focus and white balance of the image capturing apparatuses 102 and control commands (image acquisition requests) for requesting the image capturing apparatuses 102 to transmit captured images. In addition, control commands include, for example, control commands for causing the image capturing apparatuses 102 to perform various settings. Thus, the control apparatus 103 is an apparatus for controlling the setting and control of the image capturing apparatuses 102.

Figure 2:
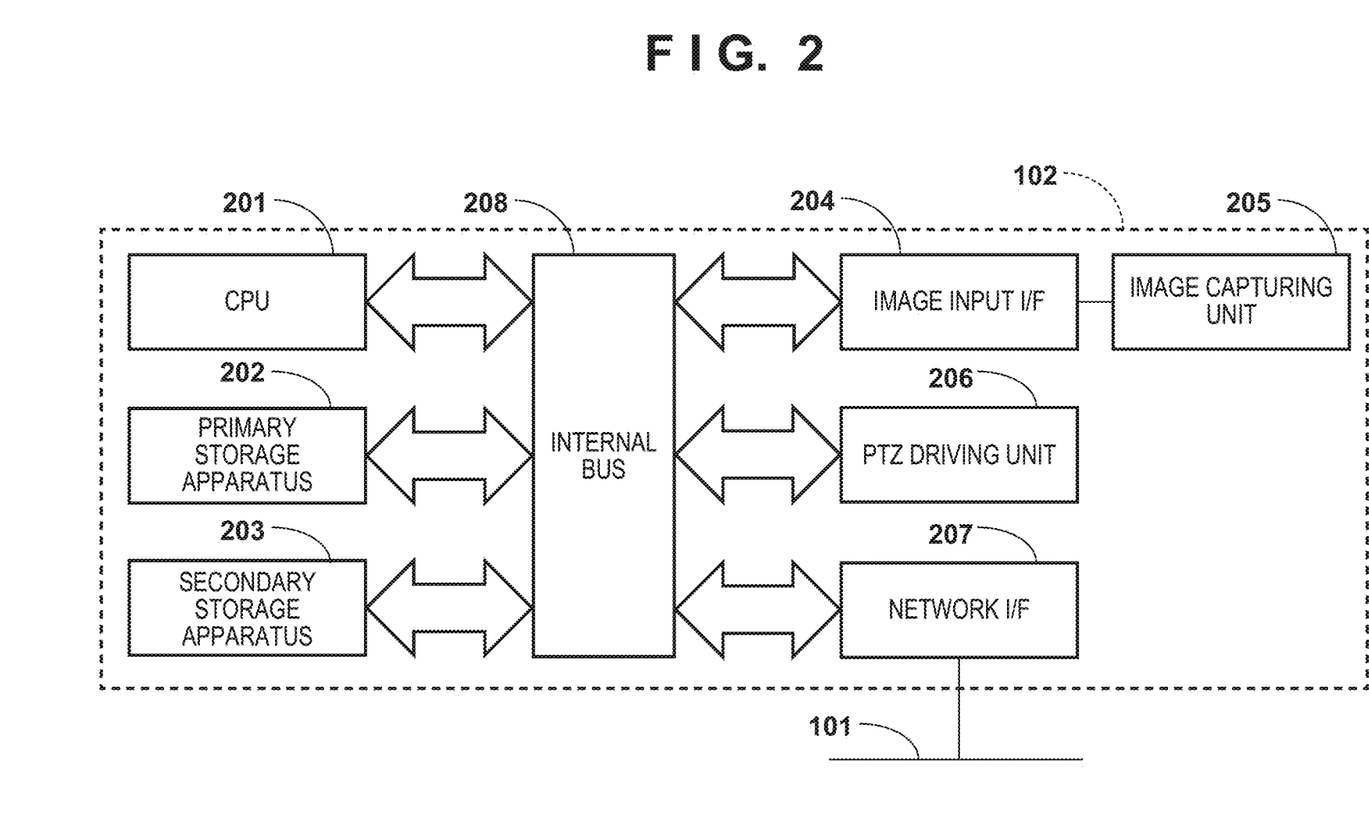
FIG. 2 is a block diagram illustrating an example of a hardware configuration of an image capturing apparatus 102.

Next, an example of a hardware configuration of the image capturing apparatuses 102 is described with reference to a block diagram of FIG. 2. Note that the configuration illustrated in FIG. 2 is an example of a hardware configuration applicable to the image capturing apparatuses 102 and does not intend to limit the image capturing apparatuses 102 to this configuration.

A CPU 201 performs various processes using computer programs and data stored in the primary storage apparatus 202 or the secondary storage apparatus 203. By this, the CPU 201 controls the entire operation of the image capturing apparatuses 102, and executes or controls each process described as being performed by the image capturing apparatuses 102.

The primary storage apparatus 202 is a "read-write high-speed storage apparatus" such as a RAM. The primary storage apparatus 202 has an area for storing computer programs and data loaded from the secondary storage apparatus 203, and an area for storing captured images inputted from an image capturing unit 205 via an image input I/F 204. The primary storage apparatus 202 further includes an area for storing data such as control commands received from the control apparatus 103 via a network I/F 207 and a work area that the CPU 201 uses when performing various processes. In this manner, the primary storage apparatus 202 can provide various areas as appropriate.

The secondary storage apparatus 203 is a non-volatile storage apparatus, such as an HDD, a flash memory, or an SD card, and may be a storage apparatus in the image capturing apparatuses 102, a storage apparatus externally attached to the image capturing apparatuses 102, or a storage apparatus capable of being attached/detached to/from the image capturing apparatuses 102. The secondary storage apparatus 203 stores computer programs and data for causing the CPU 201 to execute or control various processes described as those performed by the OS (operating system) or the image capturing apparatuses 102. The computer programs and data stored in the secondary storage apparatus 203 are loaded into the primary storage apparatus 202 as appropriate in accordance with the control of the CPU 201 and will be processed by the CPU 201.

The image capturing unit 205 includes an optical system, a drive unit for driving the optical system, an image capturing element for converting light that entered via the optical system into digital image signals by photoelectric conversion, a circuit for forming a captured image based on the digital image signals and then performing various image processes for the captured image, and the like. The image capturing element is a sensor such as a CCD (Charge Coupled Device) sensor or a CMOS (Complementary Metal Oxide Semiconductor) sensor and converts an image formed on the light receiving surface thereof into electric signals. The captured image captured by the image capturing unit 205 is transferred to the primary storage apparatus 202 and the secondary storage apparatus 203 via the image input I/F 204 and an internal bus 208.

A PTZ driving unit 206 controls pan (P), tilt (T), and zoom (Z) of the image capturing unit 205 by driving a motor or the like (not illustrated) under control by the CPU 201. By this, the image capturing apparatus 102 function as a so-called PTZ camera.

The network I/F 207 is an interface for connecting the image capturing apparatuses 102 to the above network 101, and the image capturing apparatuses 102 perform data communication with the control apparatus 103 via the network I/F 207.

The CPU 201, the primary storage apparatus 202, the secondary storage apparatus 203, the image input I/F 204, the PTZ driving unit 206, and the network I/F 207 are all connected to the internal bus 208.

Figure 3:
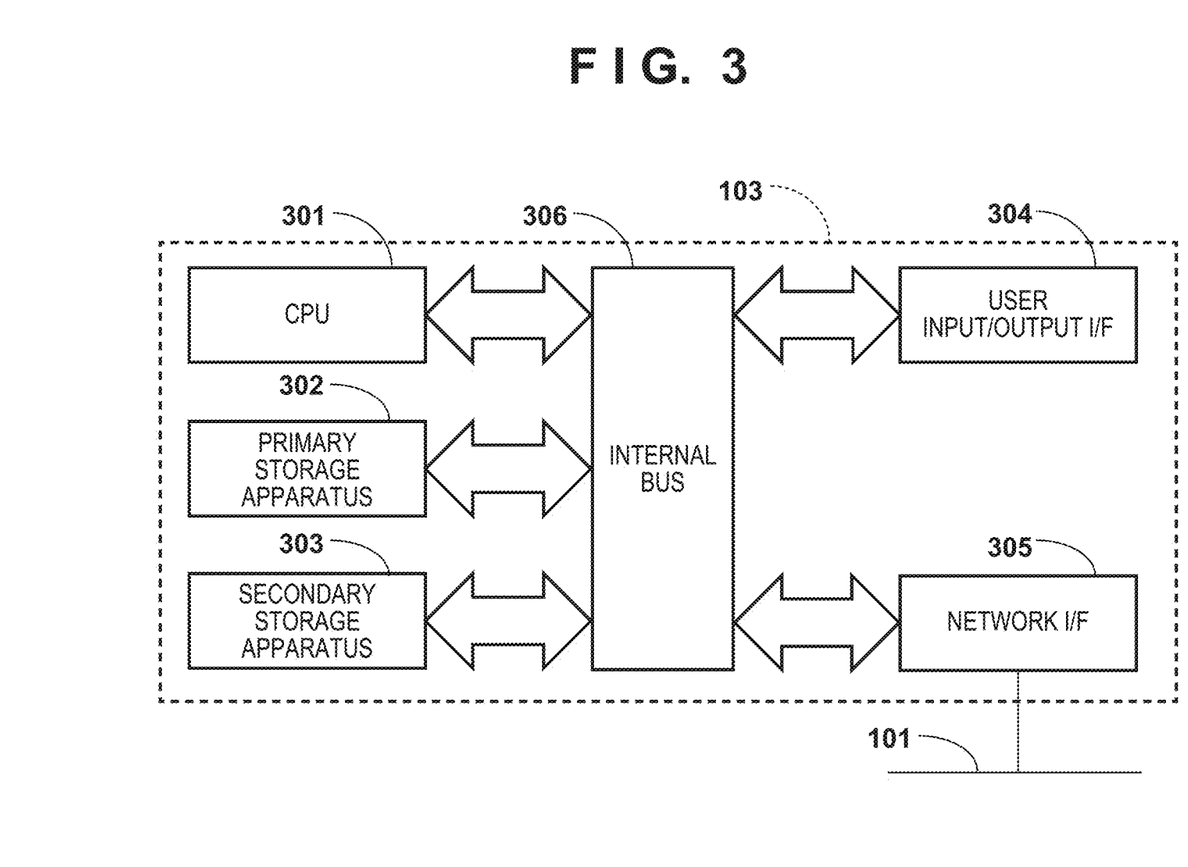
FIG. 3 is a block diagram illustrating an example of a hardware configuration of a control apparatus 103.

Next, an example of a hardware configuration of the control apparatus 103 is described with reference to a block diagram of FIG. 3. Note that the configuration illustrated in FIG. 3 is an example of a hardware configuration applicable to the control apparatus 103 and is not intended to limit the control apparatus 103 to this configuration.

A CPU 301 performs various processes using computer programs and data stored in a primary storage apparatus 302 or a secondary storage apparatus 303. By this, the CPU 301 controls the entire operation of the control apparatus 103, and executes or controls each process described as being performed by the control apparatus 103.

The primary storage apparatus 302 is a "read-write high-speed storage apparatus" such as a RAM. The primary storage apparatus 302 has an area for storing computer programs and data loaded from the secondary storage apparatus 303, and an area for storing data such as captured images received from the image capturing apparatuses 102 via a network I/F 305. The primary storage apparatus 302 further includes a work area that the CPU 301 uses when performing various operations. In this manner, the primary storage apparatus 302 can provide various areas as appropriate.

The secondary storage apparatus 303 is a non-volatile storage apparatus, such as an HDD, a flash memory, or an SD card, and may be a storage apparatus in the control apparatus 103, a storage apparatus externally attached to the control apparatus 103, or a storage apparatus capable of being attached/detached to/from the control apparatus 103. The secondary storage apparatus 303 stores computer programs and data for causing the CPU 301 to execute or control various processes described as those performed by the OS (operating system) or the control apparatus 103. The computer programs and data stored in the secondary storage apparatus 303 are loaded into the primary storage apparatus 302 as appropriate in accordance with the control of the CPU 301 and will be processed by the CPU 301.

A user input/output I/F 304 is a user interface such as a keyboard, a mouse, and a touch panel screen, and various instructions can be inputted to the CPU 301 when operated by the user. When the user input/output I/F 304 has a touch panel screen, the result (such as a screen including captured images received from the image capturing apparatuses 102) of the process by the CPU 301 can be displayed on the touch panel screen, and an operational input from the user can be accepted. Note that the user input/output I/F 304 may be a voice input device such as a microphone capable of inputting voice from a user, in which case an instruction from the user inputted by voice is recognized by a well-known voice recognition technology. In addition, the user input/output I/F 304 may include a joystick as an input device to be operated by the user to control panning, tilting, and zooming of the image capturing apparatuses 102.

Figure 4:
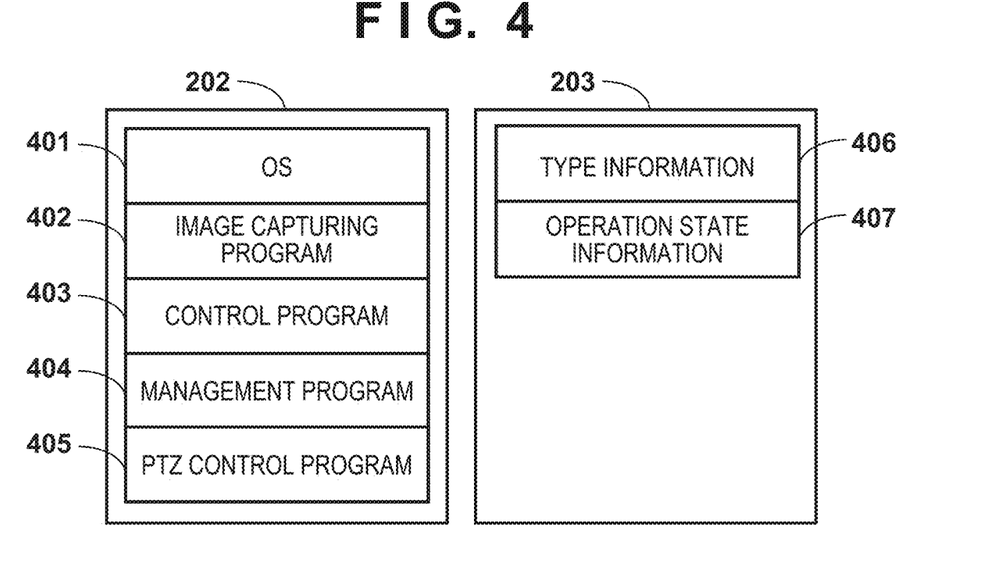
FIG. 4 is a view illustrating an example of computer programs and data stored in a primary storage apparatus 202 and a secondary storage apparatus 203.

Next, an example of computer programs and data stored in the primary storage apparatus 202 and the secondary storage apparatus 203 of the image capturing apparatuses 102 is described with reference to FIG. 4. FIG. 4 illustrates an example of computer programs and data stored in each of the primary storage apparatus 202 and the secondary storage apparatus 203 when the image capturing apparatuses 102 perform processes. In the following, computer programs stored in the primary storage apparatus 202 may be described as a subject of the processes. However, in practice, the CPU 201 realizes a function of a computer program by executing the corresponding computer program.

First, the computer program stored in the primary storage apparatus 202 of the image capturing apparatuses 102 is described.

An OS 401 is a basic program for controlling the operation of the entire image capturing apparatuses 102. The OS 401 manages the addresses and sizes of the computer programs and data in the primary storage apparatus 202 and the addresses and sizes of the computer programs and data in the secondary storage apparatus 203.

An image capturing program 402 is a computer program for acquiring a captured image captured by the image capturing unit 205 via the image input I/F 204 in response to an image acquisition request from the control apparatus 103 or an instruction from another computer program and converting the captured image into a coded image such as JPEG or a moving image such as H.264.

A control program 403 is a computer program for controlling data communication with the control apparatus 103 via the network I/F 207. Examples of content of data communication include reception of a control command from the control apparatus 103, transmission of a captured image to the control apparatus 103, and the like. Note that, a control command (request) from the control apparatus 103 may use a common communication protocol such as http (hypertext transfer protocol).

A management program 404 is a computer program for managing a control state of the image capturing apparatuses 102. In the present embodiment, the "control state of the image capturing apparatuses 102" is assumed to be "whether or not the image capturing apparatuses 102 are controlling panning". However, the state indicated by the "control state of the image capturing apparatuses 102" is not limited to a specific state and may be other states such as "whether or not the image capturing apparatuses 102 are controlling tilt/zoom" and "whether or not the image capturing apparatuses 102 are controlling a focus/tally lamp". Then, the management program 404, upon receiving a transmission request of a control state of the image capturing apparatuses 102 from the control apparatus 103, transmits the latest control state managed for the image capturing apparatuses 102 to the control apparatus 103 by controlling the control program 403.

A PTZ control program 405 is a computer program for controlling the PTZ driving unit 206 based on control commands such as a "control command for controlling pan/tilt/zoom", a "control command for moving to a preset position", and a "control command for controlling playback of a trace" received from the control apparatus 103. In addition, when the PTZ control program 405 receives a transmission request of the operation state of the image capturing apparatuses 102, it transmits the latest operation state of the image capturing apparatuses 102 to the control apparatus 103 by controlling the control program 403 in response to the transmission request.

Here, preset is a function of storing image capturing parameters such as the orientation (PTZ value), focus, and white balance of the image capturing apparatuses 102. To move to a preset position is to control the image capturing apparatuses 102 by reading out the stored preset image capturing parameters.

It is assumed here that trace is a function of storing the orientation (PTZ value) of the image capturing apparatuses 102 and the time information of executing the image capturing parameters. When the stored trace is played back, the image capturing apparatuses 102 control the PTZ and various parameters at the timing as stored.

In addition, the image capturing apparatuses 102 themselves may automatically control PTZ by a preset cycle of moving through the preset positions of a plurality of locations in order.

Next, data (information) stored in the secondary storage apparatus 203 of the image capturing apparatuses 102 are described.

Type information 406 includes control capability information indicating whether or not the image capturing apparatuses 102 are apparatuses capable of executing a specific function. The type information 406 includes control capability information related to one or more functions. For example, the control capability information related to pan, tilt, and zoom indicates a "PTZ device" when the image capturing apparatuses 102 are image capturing apparatuses capable of panning, tilting, and zooming, and indicates a "zoom device" if only zooming is possible, and indicates a "fixed machine" if all panning, tilting, and zooming is impossible. In addition, the control capability information may be information representing whether or not a particular function can be executed in a binary of TRUE (executable)/FALSE (inexecutable).

Note that, in the present embodiment, the pan function, the tilt function, and the zoom function are realized by changing the image capturing direction of the image capturing apparatuses 102 and driving the optical system of the image capturing unit 205. However, the same function may be realized by a so-called digital PTZ function in which a range of an image region to be cut out from a captured image, a position at which the image region is cut out is changed, and enlargement/reduction of the cut out image is performed.

Operation state information 407 is information representing the operation state of the image capturing apparatus 102. The management program 404 collects the operation state of the image capturing apparatuses 102, creates the operation state information 407 representing the collected operation state, and stores it in the secondary storage apparatus 203.

Note that the storage state of the computer program and the data in the primary storage apparatus 202 and the secondary storage apparatus 203 illustrated in FIG. 4 is an example and is not intended to limit the storage state. For example, the type information 406 and the operation state information 407 may already be loaded from the secondary storage apparatus 203 to the primary storage apparatus 202 by the time the processing is executed. In addition, one or more of the computer programs described above as being stored in the primary storage apparatus 202 may be loaded from the secondary storage apparatus 203 to the primary storage apparatus 202 as necessary.

Figure 5:
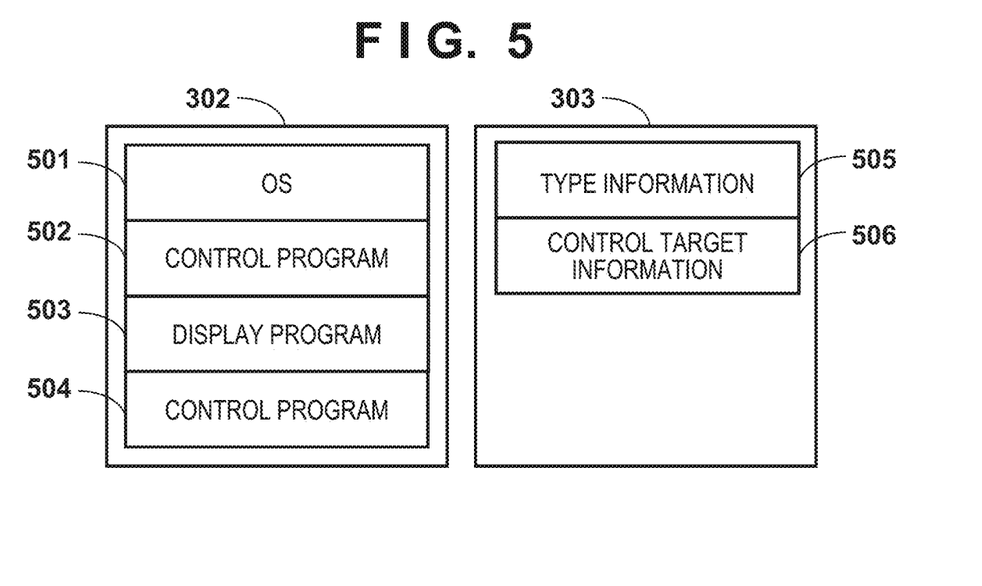
FIG. 5 is a view illustrating an example of computer programs and data stored in a primary storage apparatus 302 and a secondary storage apparatus 303.

Next, an example of computer programs and data stored in the primary storage apparatus 302 and the secondary storage apparatus 303 of the control apparatus 103 is described with reference to FIG. 5. FIG. 5 illustrates an example of computer programs and data stored in each of the primary storage apparatus 302 and the secondary storage apparatus 303 when the control apparatus 103 performs processes. In the following, computer programs stored in the primary storage apparatus 302 may be described as a subject of the processes. However, in practice, the CPU 301 realizes a function of a computer program by executing the corresponding computer program.

First, the computer programs stored in the primary storage apparatus 302 of the control apparatus 103 is described.

An OS 501 is a basic program for controlling the operation of the entire control apparatus 103. The OS 501 manages the addresses and sizes of the computer programs and data in the primary storage apparatus 302 and the addresses and sizes of the computer programs and data in the secondary storage apparatus 303.

A control program 502 is a computer program for controlling data communication with the image capturing apparatuses 102 via the network I/F 305. Examples of content of data communication include transmission of a control command to the image capturing apparatuses 102, reception of a captured image from the image capturing apparatuses 102, and the like.

A display program 503 is a computer program for displaying captured images received from the image capturing apparatuses 102, a GUI (graphical user interface) to be operated by a user to input control commands, and the like on a screen of the user input/output I/F 304. Note that the screen for displaying captured images, the GUI, and the like is not limited to the user input/output I/F 304. For example, captured images, a GUI, and the like may be displayed on an external apparatus of the control apparatus 103, and in this case, the control apparatus 103 may not have the display program 503.

A control program 504 controls the control program 502 to transmit, to the image capturing apparatuses 102, the above various control commands inputted by the user operating the user input/output I/F 304.

Next, data (information) stored in the secondary storage apparatus 303 of the control apparatus 103 is described. The type information 406 acquired from each of the image capturing apparatuses 102 is registered in type information 505.

Control target information 506 includes flag information indicating whether or not an image capturing apparatus 102 is a target of control by the control apparatus 103 (whether or not the control program 504 transmits a control command to an image capturing apparatus 102) for each of the image capturing apparatuses 102. When the user operates the user input/output I/F 304 to input a control command, the control program 504 refers to the control target information 506.

Then, the control program 504 transmits the control command to the image capturing apparatuses 102 in which the flag information is set to a "target of control by the control apparatus 103 (the control program 504 transmits the control command)". In other words, the control program 504 does not transmit the control command to an image capturing apparatuses 102 in which the flag information is set to "not a target of control by the control apparatus 103 (the control program 504 does not transmit the control command)". The control target information 506 can be appropriately edited by a user by operating the user input/output I/F 304.

Figure 6:
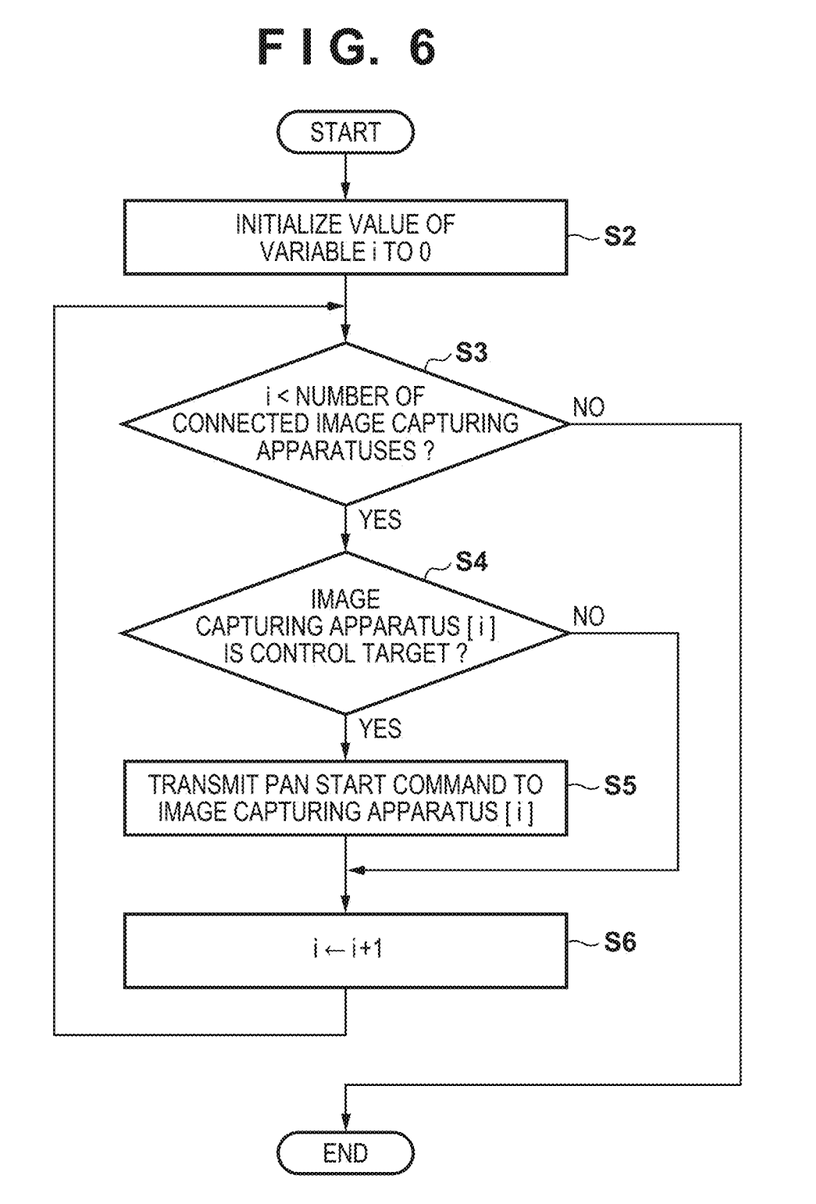
FIG. 6 is a flowchart of a control command transmission process performed by a control apparatus 103.

Next, the process of transmitting a control command by the control apparatus 103 is described in accordance with the flowchart of FIG. 6. In step S2, when the user operates the user input/output I/F 304 to input a control command, the control program 504 initializes the value of a variable i to 0. In the following, a case in which a control command that the user entered by operating the user input/output I/F 304 is a "control command for causing an image capturing apparatus 102 to start a pan operation" (pan start command) is described. The pan start command includes a pan direction and operation speed. Note that, the following description is applied similarly even if the control command is another type of control command. In addition, the input method of control commands is not limited to a particular input method, and the user may perform an input by operating, for example, a keyboard, a mouse, a touch panel screen, a joystick, and the like included in the user input/output I/F 304. Further, for example, the user may input a control command by voice toward a microphone included in the user input/output I/F 304. This applies not only to control commands but also to cases where various kinds of information is inputted to the control apparatus 103.

In step S3, the control program 504 determines whether or not the value of the variable i is less than the number of image capturing apparatuses 102 can currently communication (is connected) with the control apparatus 103. As a result of this determination, the value of the variable i, if it is less than the number of currently communicable image capturing apparatus 102 with the control apparatus 103, the process proceeds to step S4. Meanwhile, when the value of the variable i is not less than the number of image capturing apparatuses 102 that can currently communicate with the control apparatus 103, the process according to the flowchart of FIG. 6 ends.

In the following, a case where there are four image capturing apparatuses 102, "the image capturing apparatus 102*a*, the image capturing apparatus 102*b*, the image capturing apparatus 102*c*, and the image capturing apparatus 102*d*", currently capable of communicating with the control apparatus 103 is described. Therefore, in this case, if the value of the variable i is less than 4, the process will proceed to step S4, and if the value of the variable i is not less than 4, the process according to the flowchart of FIG. 6 will end.

In step S4, the control program 504 sets the image capturing apparatus 102*a* as the 0-th image capturing apparatus, the image capturing apparatus 102*b* as the 1-th image capturing apparatus, the image capturing apparatus 102*c* as the 2-th image capturing apparatus, and the image capturing apparatus 102*d* as the 3-th image capturing apparatus. Then, the control program 504 determines whether or not the flag information of the i-th image capturing apparatus (image capturing apparatus [i]) in the control target information 506 stored in the secondary storage apparatus 203 indicates a "target of control by the control apparatus 103".

As a result of this determination, when the flag information of the i-th image capturing apparatus indicates a "target of control by the control apparatus 103", the process proceeds to step S5. Meanwhile, when the flag information of the i-th image capturing apparatus indicates "not a target of control by the control apparatus 103", the process proceeds to step S6.

In step S5, the control program 504 controls the control program 502 to transmit the above pan start command to the i-th image capturing apparatus. In step S6, the control program 504 increments the value of the variable i by one. Then, the process proceeds to step S3, and the subsequent process is performed.

By performing the process according to the flowchart of FIG. 6, the control program 504 refers to the control target information 506 when transmitting a pan start command to an image capturing apparatus 102. The control program 504 transmits the pan start command to an image capturing apparatus 102 set as the control target and does not transmit the pan start command to the image capturing apparatus 102 not set as the control target.

Figure 7:
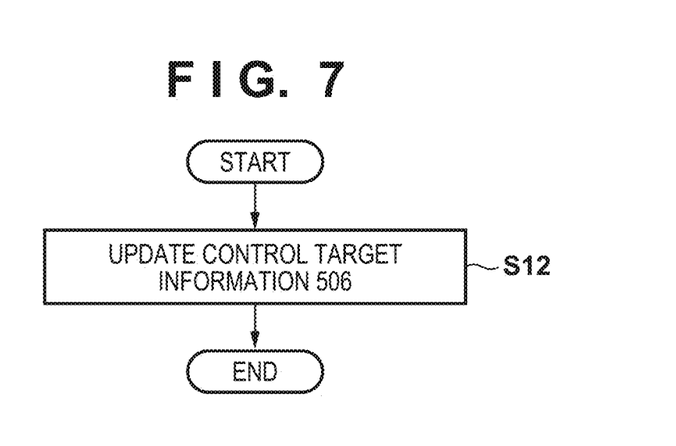
FIG. 7 is a flowchart of a process performed by the control apparatus 103 to edit desired flag information of the image capturing apparatus 102.

Next, a process that the control apparatus 103 perform for the user to edit the flag information of the target image capturing apparatus among the flag information included in the control target information 506 stored in the secondary storage apparatus 303 is described in accordance with a flowchart of FIG. 7. Hereinafter, "target image capturing apparatus" is referred to as "image capturing apparatus A".

In step S12, when the user operates the user input/output I/F 304 to perform an operation for setting the image capturing apparatus A as the control target, the control program 504 updates the flag information of the image capturing apparatus A in the control target information 506 to a "target of control by the control apparatus 103".

Various operation methods are applicable to "operation for setting the image capturing apparatus A to the control target". For example, identification information of each of the image capturing apparatuses 102 included in the control target information 506 (such as the names of the image capturing apparatuses 102) is displayed together with checkboxes on the screen that the user input/output I/F 304 has. When the user operates the user input/output I/F 304 to turn on (add a check mark) a check box corresponding to the image capturing apparatus A and then inputs a decision instruction, the flag information of the image capturing apparatus A is updated to a "target of control by the control apparatus 103".

Figure 8:
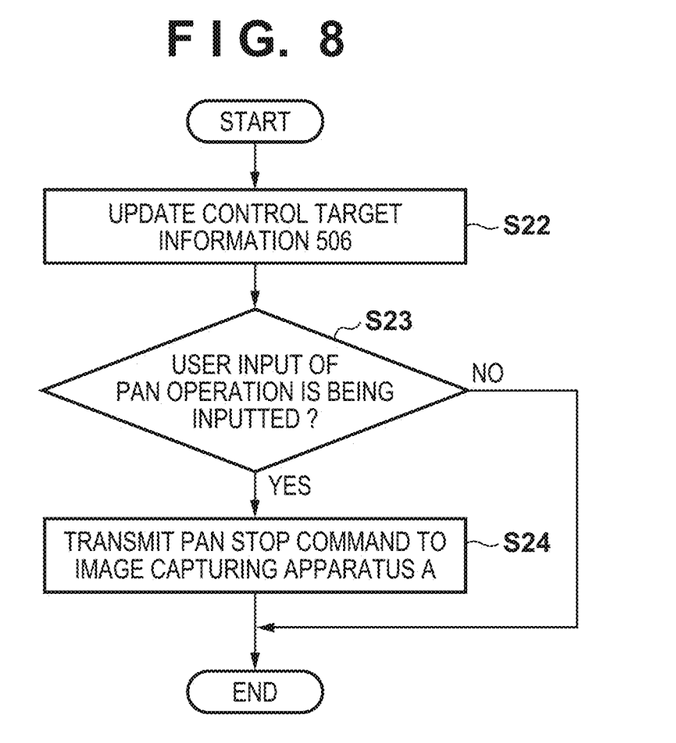
FIG. 8 is a flowchart of a process performed by the control apparatus 103 when performing an operation for removing an image capturing apparatus A from the control target.

Next, a process that the control apparatus 103 performs when the user operates the user input/output I/F 304 to perform an operation for removing the image capturing apparatus A from the control target is described in accordance with a flow chart of FIG. 8.

In step S22, when the user operates the user input/output I/F 304 to perform an operation for removing the image capturing apparatus A from the control target, the control program 504 updates the flag information of the image capturing apparatus A in the control target information 506 to "not a target of control by the control apparatus 103". Thereby, the control target information 506 is updated.

Various operation methods are applicable to "operation for removing the image capturing apparatus A from the control target". For example, identification information of each of the image capturing apparatuses 102 included in the control target information 506 is displayed together with checkboxes on the screen that the user input/output I/F 304 has. When the user operates the user input/output I/F 304 to turn off (remove a check mark) a check box corresponding to the image capturing apparatus A and then inputs a decision instruction, the flag information of the image capturing apparatus A is updated to "not a target of control by the control apparatus 103".

In step S23, the control program 504 determines whether or not a control command for causing the image capturing apparatus A to execute a pan operation is being inputted. There are various determination methods for determining whether or not a control command for causing the image capturing apparatus A to execute a pan operation is being inputted.

When a control command (pan stop command) for stopping (ending) the pan operation is not transmitted to the image capturing apparatus A after the pan start command inputted in response to the user operation is transmitted to the image capturing apparatus A, the image capturing apparatus A continues the pan operation. In such a case, the control program 504 determines that a "control command for causing the image capturing apparatus A to execute a pan operation is being inputted".

In addition, it is also assumed that the image capturing apparatus A continues to perform the pan operation while the user is performing an operation instructing the pan operation, such as pressing a button in the user input/output I/F 304 or a button displayed on the screen of the user input/output I/F 304. In this case, when the user starts an operation for instructing a pan operation, a pan start command is transmitted to the image capturing apparatus A, and when the user stops the operation, a pan stop command is transmitted to the image capturing apparatus A. In such a case, the control program 504 determines that a "control command for causing the image capturing apparatus A to execute a pan operation is being inputted" while the user is performing an operation instructing the pan operation.

That is, determining "whether or not a control command for causing the image capturing apparatus A to execute the pan operation is being inputted" also determines whether or not the "image capturing apparatus A is executing the pan operation".

As a result of such determination, if a control command for causing the image capturing apparatus A to execute the pan operation is being inputted, the process proceeds to step S24. Meanwhile, when the control command for causing the image capturing apparatus A to execute the pan operation is not being inputted, the process according to the flowchart of FIG. 8 ends. In step S24, the control program 504 controls the control program 502 to transmit the above pan stop command to the image capturing apparatus A.

By performing the process according to the flowchart of FIG. 8, when a user operation for removing the image capturing apparatus A from the control target is performed, the control program 504 removes the image capturing apparatus A from the control target and transmits a pan stop command to the image capturing apparatus A to cause the image capturing apparatus A to stop the pan operation if a control command for causing the image capturing apparatus A to execute the pan operation is being inputted.

Note that the process according to the flowchart of FIG. 6 and the process according to the flowchart of FIG. 8 can be operated in parallel, and even when the process according to the flowchart of FIG. 6 is being executed, the process according to the flowchart of FIG. 8 can be executed by interruption.

As described above, according to the present embodiment, if the user operation for causing the image capturing apparatus to execute the specific function is being performed when an image capturing apparatus is removed from the control target, a command for stopping the execution of the specific function is transmitted to the image capturing apparatus. Therefore, even if the image capturing apparatus that is executing the specific function is removed from the control target, it is possible to prevent the image capturing apparatus from continuing to execute the specific function.

Note that, in the present embodiment, the pan control is handled as an example, but the same applies to the entire start/stop control in which a control start command and a control stop command are used in a set.

In addition, in the present embodiment, that the image capturing apparatus A is removed from the control target or that the pan control being operated in the image capturing apparatus A is stopped may be notified to the user by displaying these pieces of information on the screen of the user input/output I/F 304 by image or text.

Second Embodiment

In the present embodiment, differences from the first embodiment are described, and unless specifically mentioned below, it is assumed the present embodiment is the same as the first embodiment. In the first embodiment, it is determined whether or not a control command for causing the image capturing apparatus A to execute a pan operation is being inputted when a user operation for removing the image capturing apparatus A from the control target is performed. In the present embodiment, when the user operation to remove the image capturing apparatus A from the control target is performed, it is determined whether or not the image capturing apparatus A is executing the pan operation (controlling panning) by referring to the operation state of the image capturing apparatus A.

Figure 9:
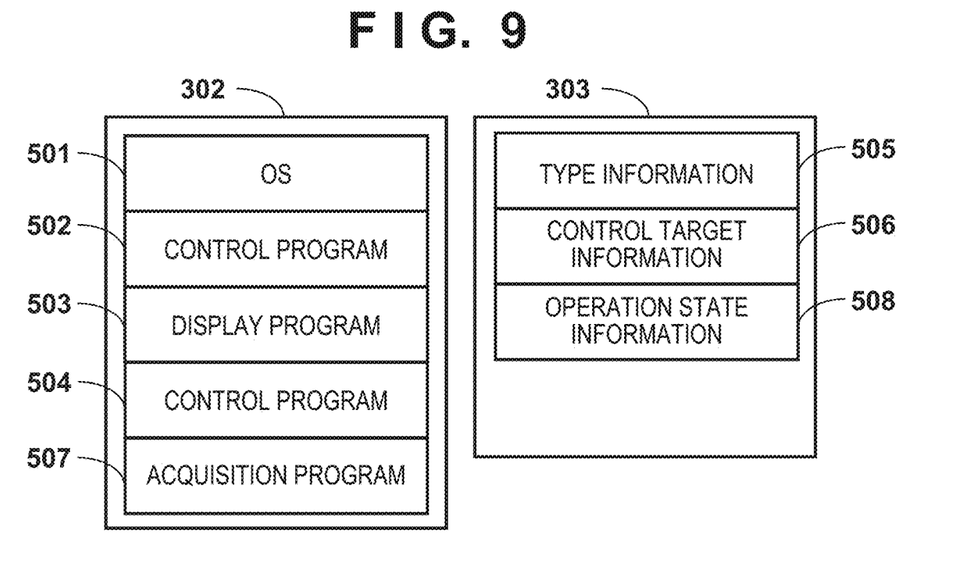
FIG. 9 is a view illustrating an example of computer programs and data stored in the primary storage apparatus 302 and the secondary storage apparatus 303.

An example of computer programs and data stored in the primary storage apparatus 302 and the secondary storage apparatus 303 of the control apparatus 103 is described with reference to FIG. 9. FIG. 9 illustrates an example of computer programs and data stored in each of the primary storage apparatus 302 and the secondary storage apparatus 303 when the control apparatus 103 performs processes.

Note that, in FIG. 9, the same reference numerals are given to the same computer programs and data as the computer programs and data shown in FIG. 5, and a description of these computer programs and data is omitted.

First, the computer programs stored in the primary storage apparatus 302 of the control apparatus 103 are described. An acquisition program 507 transmits an information acquisition command as a control command to an image capturing apparatus 102, receives the operation state information 407 transmitted by the control program 502 of the image capturing apparatus 102 in response to the information acquisition command, and registers it in operation state information 508. The acquisition program 507 periodically performs this series of processes. Note that, an image capturing apparatus 102 may transmit the updated operation state information 407 to the control apparatus 103 when the operation state information 407 is updated. In this case, the acquisition program 507 receives the operation state information 407 and registers it in the operation state information 508 when the operation state information 407 is transmitted from an image capturing apparatus 102.

Next, data (information) registered in the secondary storage apparatus 303 of the control apparatus 103 are described. The operation state information 407 that the control apparatus 103 has received from the respective image capturing apparatuses 102 is registered in the operation state information 508.

Figure 10:
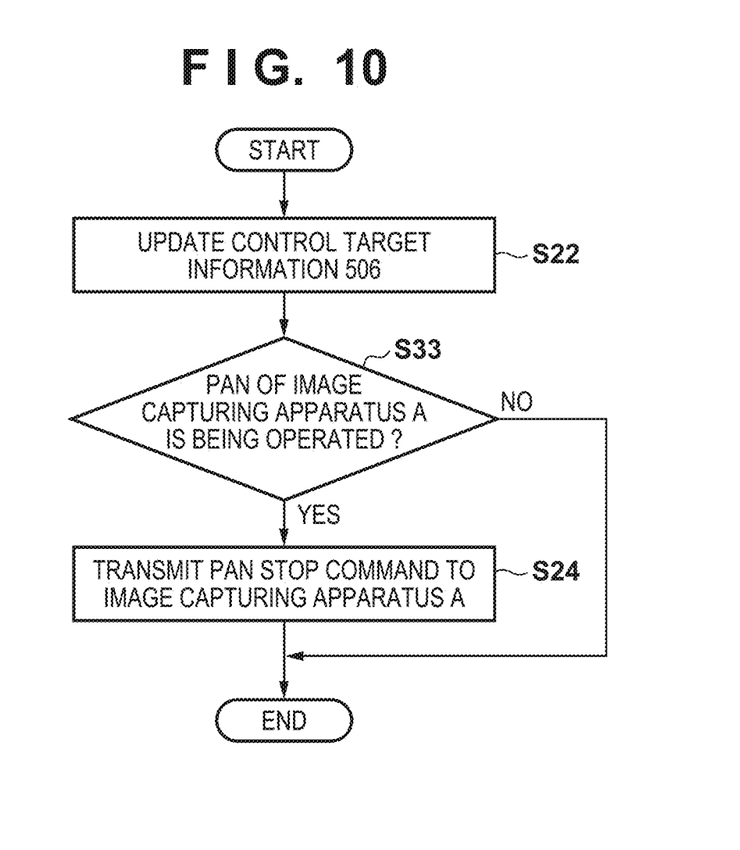
FIG. 10 is a flowchart of a process performed by the control apparatus 103 when performing an operation for removing the image capturing apparatus A from the control target.

Next, a process that the control apparatus 103 performs when the user operates the user input/output I/F 304 to perform an operation for removing the image capturing apparatus A from the control target is described in accordance with a flow chart of FIG. 10. In FIG. 10, the process steps that are the same as those illustrated in FIG. 8 are denoted by the same step numbers, and a description of these process steps is omitted.

In step S33, the control program 504 determines whether or not the image capturing apparatus A is executing a pan operation (controlling panning). There are various determination methods for determining whether or not the image capturing apparatus A is executing a pan operation (controlling panning).

For example, the control program 504 refers to the "operation state information 407 of the image capturing apparatus A" registered in the operation state information 508 stored in the secondary storage apparatus 303. Then, the control program 504, when the operation state information 407 of the image capturing apparatus A indicates that the "image capturing apparatus A is executing the pan operation", determines that the image capturing apparatus A is in the pan operation (controlling panning). Meanwhile, the control program 504, when the operation state information 407 of the image capturing apparatus A indicates that the "image capturing apparatus A is not executing the pan operation", determines that the image capturing apparatus A is not executing the pan operation (controlling panning).

As a result of such determination, if the image capturing apparatus A is executing the pan operation (controlling panning), the process proceeds to step S24. Meanwhile, when the image capturing apparatus A is not executing the pan operation (controlling panning), the process according to the flowchart of FIG. 10 ends.

By performing the process according to the flowchart of FIG. 10, when a user operation for removing the image capturing apparatus A from the control target is performed, the control program 504 removes the image capturing apparatus A from the control target and transmits a pan stop command to the image capturing apparatus A to cause the image capturing apparatus A to stop the pan operation if the image capturing apparatus A is executing the pan operation.

Note that the process according to the flowchart of FIG. 6 and the process according to the flowchart of FIG. 10 can be operated in parallel, and even when the process according to the flowchart of FIG. 6 is being executed, the process according to the flowchart of FIG. 10 can be executed by interruption.

As described above, according to the present embodiment, if an image capturing apparatus is executing a specific function when the image capturing apparatus is removed from the control target, a command for stopping the execution of the specific function is transmitted to the image capturing apparatus. Therefore, even if the image capturing apparatus that is executing the specific function is removed from the control target, it is possible to prevent the image capturing apparatus from continuing to execute the specific function.

Note that, in the present embodiment, it is determined whether or not to transmit a stop command for stopping the function being executed by the image capturing apparatus based on the operation state of the image capturing apparatus removed from the control target. However, the stop command (stop command for start-stop control) may be unconditionally transmitted to the image capturing apparatus removed from the control target.

Variation of Second Embodiment

In the following, differences from the second embodiment are described, and unless specifically mentioned below, it is assumed the present embodiment is the same as the second embodiment. In the second embodiment, a case where a specific function is stopped in accordance with the operation state of the image capturing apparatus when the image capturing apparatus is removed from the control target has been described. In the present variation, if a specific function is in operation in the image capturing apparatus and an automatic control function of the image capturing apparatus is not operating when removing the image capturing apparatus from the control target, a command for stopping the operation of the specific function is transmitted to the image capturing apparatus. Note that, preset, preset cycle, trace, and the like are given as automatic control functions of the image capturing apparatus.

Figure 11:
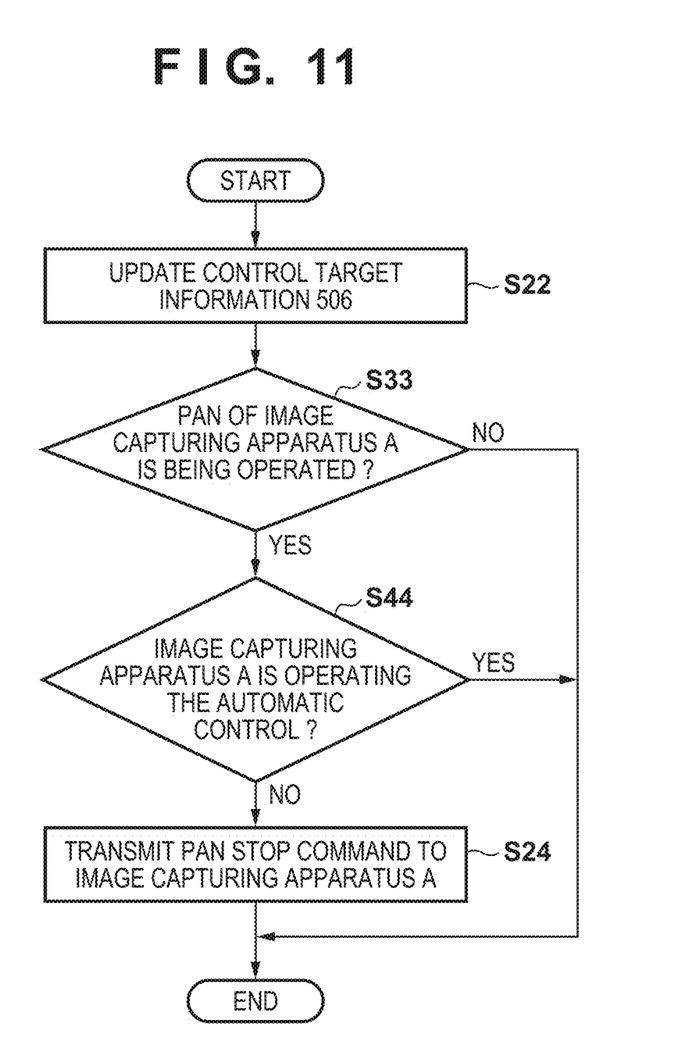
FIG. 11 is a flowchart of a process performed by the control apparatus 103 when performing an operation for removing the image capturing apparatus A from the control target.

Next, a process that the control apparatus 103 performs when the user operates the user input/output I/F 304 to perform an operation for removing the image capturing apparatus A from the control target is described in accordance with a flow chart of FIG. 11. In FIG. 11, the process steps that are the same as those illustrated in FIG. 10 are denoted by the same step numbers, and a description of these process steps is omitted.

As a result of a determination in step S33, if the image capturing apparatus A is executing the pan operation (controlling panning), the process proceeds to step S44. Meanwhile, when the image capturing apparatus A is not executing the pan operation (controlling panning), the process according to the flowchart of FIG. 11 ends.

In step S44, the control program 504 refers to information indicating "whether or not the image capturing apparatus A is operating the automatic control function" registered as the operation state of the image capturing apparatus A in the operation state information 508. When the information indicates that the "image capturing apparatus A is not operating the automatic control function", the process proceeds to step S24. Meanwhile, when the information indicates that the "image capturing apparatus A is operating the automatic control function", the process according to the flowchart of FIG. 11 ends. In the present embodiment, it is assumed that the automatic control function is at least one of preset, preset cycle, and trace, but the present invention is not limited thereto.

By performing the process according to the flowchart of FIG. 11, when a user operation for removing the image capturing apparatus A from the control target is performed, the control program 504 removes the image capturing apparatus A from the control target and transmits a pan stop command to the image capturing apparatus A to cause the image capturing apparatus A to stop the pan operation if the image capturing apparatus A is executing the pan operation and the image capturing apparatus A is not operating the automatic control function.

As described above, according to the present embodiment, if an image capturing apparatus is executing a specific function and the image capturing apparatus is not operating an automatic control function when the image capturing apparatus is removed from the control target, a command for stopping the execution of the specific function is transmitted to the image capturing apparatus. Therefore, even if the image capturing apparatus that is executing the specific function is removed from the control target, it is possible to prevent the image capturing apparatus from continuing to execute the specific function.

Note that, in each of the above-described embodiments and variations, each of the above-described processes is executed by the CPU executing the computer programs stored in the primary storage apparatus. However, instead of the computer programs, each the above-described processes may be executed using hardware that implements the functions of the computer program.

In addition, the numerical values, processing timing, processing order, transmission destination/transmission source of data (information) used in each of the above embodiments and variations are given by way of example in order to provide a specific explanation, and the present invention is not intended to be limited to such an example.

In addition, some or all of the above-described embodiments and variations may be used in combination as appropriate. In addition, some or all of the above-described embodiments and variations may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-189787, filed Nov. 13, 2020, which is hereby incorporated by reference herein in its entirety.

What is claimed is:

1. A control apparatus comprising a computer executing instructions which, when executed by the computer, cause the control apparatus to:
   determine whether an operation state indicates that an image capturing apparatus is operating an automatic control function or not; and
   in a case where an operation for removing the image capturing apparatus set as a control target of the control apparatus from the control target is performed by a user instruction;
   when the operation state is determined to indicate that the image capturing apparatus set as the control target is not operating the automatic control function, transmit, to the image capturing apparatus set as the control target, a command so as to stop controlling a specific function of the image capturing apparatus set as the control target, and
   when the operation state is determined to indicate that the image capturing apparatus set as the control target is operating the automatic control function, keep controlling a specific function of the image capturing apparatus set as the control target.

2. The control apparatus according to claim 1, wherein the specific function is a function of controlling a pan of the image capturing apparatus.

3. The control apparatus according to claim 1, wherein the specific function is a function of controlling a tilt of the image capturing apparatus.

4. The control apparatus according to claim 1, wherein the specific function is a function of controlling a zoom of the image capturing apparatus.

5. The control apparatus according to claim 1, wherein the automatic control function is at least one of a preset, a preset cycle, and a trace.

6. A control apparatus comprising a computer executing instructions which, when executed by the computer, cause the control apparatus to:
   determine whether an operation state indicates that an image capturing apparatus is operating an automatic control function or not; and
   in a case where a specific operation is performed by a user instruction;
   when the operation state is determined to indicate that the image capturing apparatus set as a control target of the control apparatus is not operating the automatic control function, transmit, to the image capturing apparatus set as the control target, a command so as to stop controlling pan or tilt of the image capturing apparatus set as the control target, and
   when the operation state is determined to indicate that the image capturing apparatus set as the control target is operating the automatic control function, keep controlling pan or tilt of the image capturing apparatus set as the control target.

7. The control apparatus according to claim 6, wherein the specific operation is an operation for removing the image capturing apparatus set as the control target from the control target.

8. The control apparatus according to claim 6, wherein the automatic control function is at least one of a preset, a preset cycle, and a trace.

9. A control method, comprising:
   determining whether an operation state indicates that an image capturing apparatus is operating an automatic control function or not; and
   in a case where an operation for removing the image capturing apparatus set as a control target of the control apparatus from the control target is performed by a user instruction;

when the operation state is determined to indicate that the image capturing apparatus set as the control target is not operating the automatic control function, transmitting, to the image capturing apparatus set as the control target, a command so as to stop controlling a specific function of the image capturing apparatus set as the control target, and when the operation state is determined to indicate that the image capturing apparatus set as the control target is operating the automatic control function, keeping controlling a specific function of the image capturing apparatus set as the control target.

10. A control method, comprising:

determining whether an operation state indicates that an image capturing apparatus is operating an automatic control function or not; and in a case where a specific operation is performed by a user instruction;

when the operation state is determined to indicate that the image capturing apparatus set as a control target of the control apparatus is not operating the automatic control function, transmitting, to the image capturing apparatus set as the control target, a command so as to stop controlling pan or tilt of the image capturing apparatus set as the control target, and when the operation state is determined to indicate that the image capturing apparatus set as the control target is operating the automatic control function, keeping controlling pan or tilt of the image capturing apparatus set as the control target.

11. A non-transitory computer readable medium that stores a program, wherein the program causes a computer to execute a control method comprising:

determining whether an operation state indicates that an image capturing apparatus is operating an automatic control function or not; and in a case where an operation for removing the image capturing apparatus set as a control target of the control apparatus from the control target is performed by a user instruction;

when the operation state is determined to indicate that the image capturing apparatus set as the control target is not operating the automatic control function, transmitting, to the image capturing apparatus set as the control target, a command so as to stop controlling a specific function of the image capturing apparatus set as the control target, and when the operation state is determined to indicate that the image capturing apparatus set as the control target is operating the automatic control function, keeping controlling a specific function of the image capturing apparatus set as the control target.

12. A non-transitory computer readable medium that stores a program, wherein the program causes a computer to execute a control method comprising:

determining whether an operation state indicates that an image capturing apparatus is operating an automatic control function or not; and in a case where a specific operation is performed by a user instruction;

when the operation state is determined to indicate that the image capturing apparatus set as a control target of the control apparatus is not operating the automatic control function, transmitting, to the image capturing apparatus set as the control target, a command so as to stop controlling pan or tilt of the image capturing apparatus set as the control target, and when the operation state is determined to indicate that the image capturing apparatus set as the control target is operating the automatic control function, keeping controlling pan or tilt of the image capturing apparatus set as the control target.

* * * * *